[12] United States Patent
Natarajan

(10) Patent No.: US 8,358,784 B2
(45) Date of Patent: Jan. 22, 2013

(54) SYSTEM AND METHOD FOR A SECURE SYNCHRONIZATION BETWEEN A WIRELESS COMMUNICATION DEVICE AND A SERVER

(75) Inventor: Vijayarangan Natarajan, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 216 days.

(21) Appl. No.: 12/967,280

(22) Filed: Dec. 14, 2010

(65) Prior Publication Data

US 2011/0164751 A1 Jul. 7, 2011

(51) Int. Cl.
*H04K 1/00* (2006.01)
(52) U.S. Cl. ........................................ 380/274
(58) Field of Classification Search ............ 380/274
See application file for complete search history.

(56) References Cited

U.S. PATENT DOCUMENTS

| 6,076,097 A | 6/2000 | London et al. |
| 6,647,402 B1 | 11/2003 | Chiu |
| 2006/0218396 A1* | 9/2006 | Laitinen et al. ............ 713/167 |
| 2007/0094561 A1* | 4/2007 | Udell et al. .................. 714/738 |
| 2009/0150467 A1* | 6/2009 | Neumann et al. ............ 708/254 |
| 2009/0193065 A1 | 7/2009 | Vijayarangan et al. |

* cited by examiner

*Primary Examiner* — Jason K. Gee
*Assistant Examiner* — Abiy Getachew
(74) *Attorney, Agent, or Firm* — Akerman Senterfitt; Peter A. Chiabotti; Roy Zacariah

(57) ABSTRACT

The present invention provides a system and method for designing secure synchronization protocols in mobile communication by using Deterministic Random Number Generator (DRNG) through linear operators without using multiprecision integers. It also provides an efficient way to generate a huge size collection of pseudorandom numbers with a less computational complexity and DRSG is designed for mobile and wireless communications and also the said DRSG algorithm is a lightweight algorithm. The generated sequence has a lot of applications in Mobile computation and Information security. The invention provides a securely transfer of registry and provision of consumer details over the communication network and also provide a light weight security with better performance in comparison to the lower layer chip level security provided by 2G, 3G or 4G applications.

7 Claims, 5 Drawing Sheets

# SYSTEM AND METHOD FOR A SECURE SYNCHRONIZATION BETWEEN A WIRELESS COMMUNICATION DEVICE AND A SERVER

CROSS REFERENCE TO RELATED APPLICATION

This application claims the benefits of Indian Provisional Patent Application No. 12/MUM/2010, filed on Jan. 4, 2010, the contents of which are hereby incorporated by reference in its entirety.

FIELD OF THE INVENTION

This invention relates to the fields of Information security and client-server applications. Particularly, the invention relates to a system and method for designing secure synchronization protocols in mobile communication by Deterministic Random Sequence Generator (DRSG) through linear operators without using multi-precision integers.

BACKGROUND OF THE INVENTION

In the mobile communication, the workstation has to identify their clients by means of synchronization process. From both parties (client and server), they have to perform the same mechanism and the server can verify the identity of each client. In order to execute this synchronization process, a random sequence of arbitrary n-bits length is to be generated at client-end through a linear operator with client's personnel data and then the server has to validate the generated random sequence. When multi-precision integers are used in client-server communication, the protocol becomes heavy and then it is difficult for implementation as well as performance degradation. All mobile processors won't support high-end computation while using multi-precision libraries.

U.S. Pat. No. 6,076,097 by London et al. discloses that a system and method for generating random data without using devices such as gas discharge tubes, leaky capacitors, noise generators or keyboard strokes, and without occupying UNIX timers and/or signals.

U.S. Pat. No. 6,647,402 by Chiu discloses that a process for generating a needed serial number for use from random number. In most devices nowadays, a Central Processing Unit (CPU) is installed; therefore it will not be a problem to generate a random number. The invention can save time and the expense of related components, and can at the same time avoid the interference of the same serial numbers; thereby devices of the same kind can be installed on the same bus.

United States Patent Application 20090150467 by Neumann et al. discloses that methods of generating pseudo-random numbers. This process done by means of an iteration, comprising at least two iteration steps, applied to a one-way function, wherein the one-way function, based on a start value and a key, generates part of the pseudo-random number and wherein the iteration is initialized with a random start value and a random key, and wherein, in each iteration step, both the start value and the key for an iteration step are determined from the part of the pseudo-random number determined in the previous iteration step using the one-way function.

United States Patent Application No. 20090193065 by Vijayarangan et al. teaches that a deterministic random number generator for Cryptography and Digital watermarking. It is based on an infinite Pi series that undergoes shuffling, nonlinear and LFSR operations.

None of the above mentioned prior arts provide a system and method for a lightweight and high speed secure synchronization protocols, which occupy less memory space for storage, for mobile and wireless communications and also provide secure synchronization protocols which are suitable for wireless communication devices enabled with 2G, 3G or 4G networks.

Thus, in the light of the above mentioned prior art, it is evident that, there is a need to system and method which: Designs secure synchronization protocols for secure synchronization between at least one wireless communication device and a server at an affordable cost; Provides an efficient way of producing a random sequence generated by wireless communication device without using multi-precision integers; Provides two way authentication in comparison to the current one way authentication standards for secure synchronization between at least one wireless communication device and a server; and Provides secure synchronization protocols which are easy to deploy on existing wireless communication devices.

SUMMARY OF THE INVENTION

Before the present methods, and systems enablement are described, it is to be understood that this invention in not limited to the particular systems, and methodologies described, as there can be multiple possible embodiments of the present invention and which are not expressly illustrated in the present disclosures. It is also to be understood that the terminology used in the description is for the purpose of describing the particular versions or embodiments only, and is not intended to limit the scope of the present invention which will be limited only by the appended claims.

A primary object of the invention is to provide a system and method for secure synchronization between at least one wireless communication device and a server by using Deterministic Random Number Generator (DRNG) through linear operators without using multi-precision integers.

Another object of the invention is to provide a secure synchronization protocol, for secure synchronization between at least one wireless communication device and a server, by using Deterministic Random Number Generator (DRNG) through linear operators without using multi-precision integers.

Yet another object of the invention is to provide a method which is an efficient way of producing a random sequence generated by wireless communication device without using multi-precision integers.

It is still another object of the invention to provide a securely transfer of registry and provision of consumer details over the communication network.

It is yet another object of the invention to provide a light weight security with better performance in comparison to the lower layer chip level security provided by 2G, 3G or 4G applications.

It is further another object of the invention to provide a provision of two way authentication in comparison to the current one way authentication standards for secure synchronization between at least one wireless communication device and a server.

The present invention provides a system and method for secure synchronization between at least one wireless communication device and a server. Both parties perform to generate a random sequence (in a secure manner) based on wireless communication device's personnel information and then exchange the random sequence.

According to one embodiment of the invention, a random sequence of n-bits length is generated from a set of m-bit random numbers (m<n). This generation process is performed through a linear operator. It is an efficient way of generating a random sequence having a large bit stream used by the wireless communication device and the server. After computing a sequence from this process, the wireless communication device sends it to the server which verifies the sequence with the help of wireless communication device's personnel data. Finally, the mutual authentication between both the wireless communication device and server takes place at the wireless communication device and server prior to being synchronized to the server by the wireless communication device.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings example constructions of the invention; however, the invention is not limited to the specific methods and system disclosed. In the drawings.

DETAILED DESCRIPTION OF THE INVENTION

Figure 1:
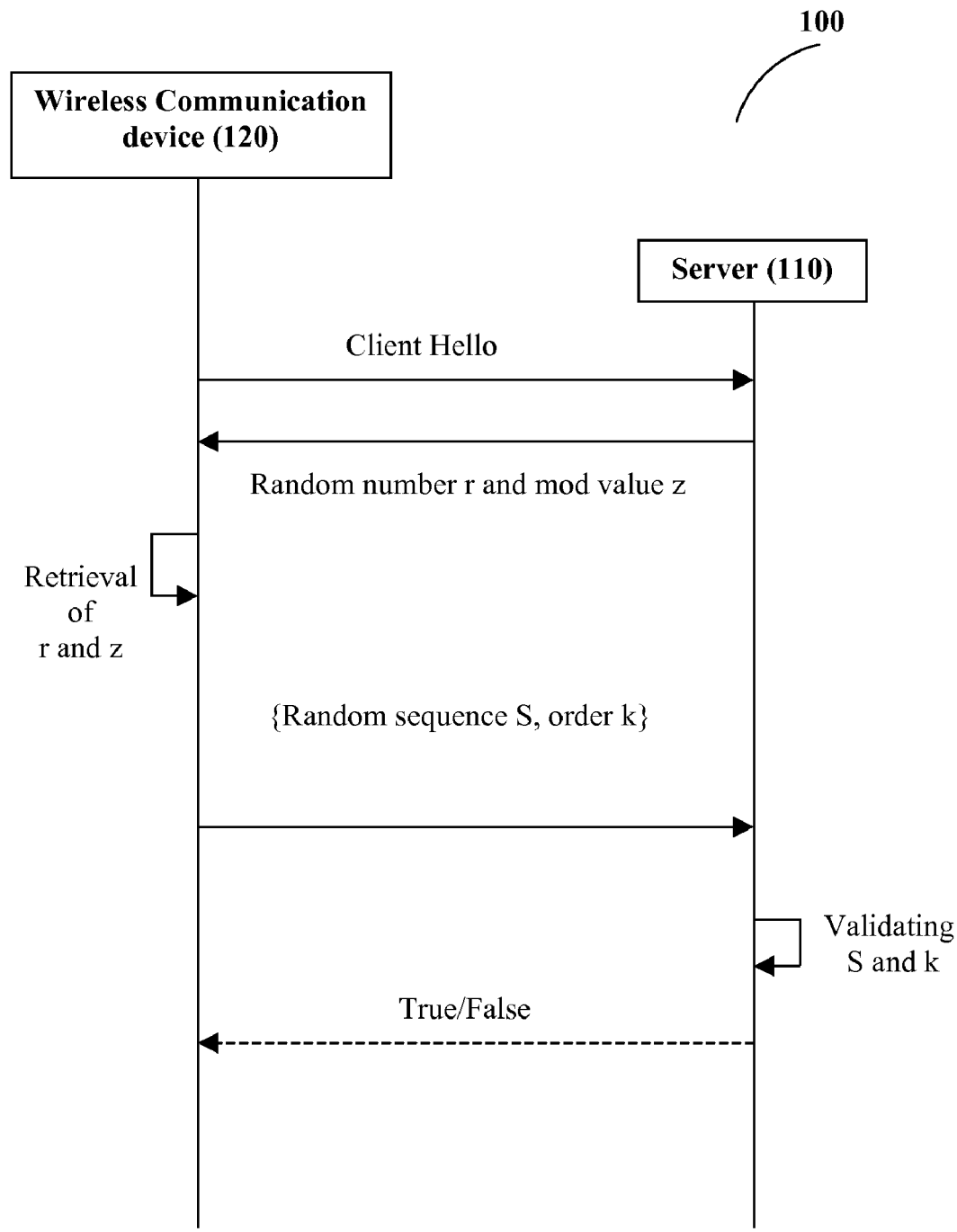
FIG. 1 illustrates a methodology of synchronization protocol for secure synchronization between wireless communication device and server according to various embodiments of the invention.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The disclosed embodiments are merely exemplary of the invention, which may be embodied in various forms.

Gilbreath, a Mathematician, found patterns on primes which are arranged in the increasing order starting from an even prime number 2. The inventors have done research work on primes which are arranged in a random manner. The inventors have found a random sequence which is driven from a set of random primes. While proceeding in the same line, an important thing has been absorbed by inventors that it is sufficient to consider a set of random integers for generating a random sequence. This random sequence is used between client and server communication.

Accordingly, the present invention provides a system and method for secure synchronization between at least one wireless communication device and a server by using Deterministic Random Number Generator (DRNG) through linear operators without using multi-precision integers at an affordable cost.

A method, comprising: receiving, from a wireless communication device, a connection attempt to synchronize a server; performing a secure authentication process to facilitate the wireless communication device prior to being synchronized to the server, wherein the said secure authentication process comprising the steps of: sending client hello message by the wireless communication device to initiate the communication to the Server; generating a random number and a modulo value by the server after receiving client hello message and subsequently sending the generated random number and the modulo value to the wireless communication device via a secure channel by the server; retrieving the random number and the modulo value by the wireless communication device, and then subsequently generating a random sequence using DRSG algorithm, encrypting the generated random sequence and order of the sequence using pre-shared private key of the wireless communication device and subsequently encrypting the encrypted sequence using a session key generated through DRSG algorithm and sending the encrypted message containing generated random sequence and order of the sequence to the server by the wireless communication device; decrypting received encrypted message by the server, subsequently retrieving the random sequence and order of the sequence and then server computing a new random sequences using DRSG algorithm with the help of other information of the wireless communication device and the server validating generated sequence and the order of the sequence with the received sequence and the order of the received sequence from the wireless communication device by the server; accepting synchronization process between the wireless communication device and the server by the server, if the sequences and the order of the sequences generated by the server are equal to the sequences and the order of the sequences generated by the wireless communication device and sending the response after validating the sequences and the order of the sequences generated by both the server and the wireless communication device to the wireless communication device by the server; and the mutual authentication between both the wireless communication device and server takes place at the wireless communication device and server.

FIG. 1 illustrates a methodology of synchronization protocol for secure synchronization between wireless communication device and server according to various embodiments of the invention. A system 100 comprises a server 110 and a wireless communication device 120 are communicatively coupled with each other via communication network; the communication network can be selected from the group of Wide area network (WAN), Local Area Network (LAN) or Metropolitan Area Networks (MAN), internet, intranet, etc and the wireless communication device 120 can be selected from one of the group of mobile handsets, smart phones, PDAs, cellular phones, or tiny devices and the wireless communication device enabled with 2G, 3G, or 4G networks. According to one exemplary embodiment of the invention, the wireless communication device 120 can be mobile phone.

A method of communication used in the above said system 100 comprising receiving, from at least one wireless communication device 120, a connection attempt to access a server 110; performing a secure authentication process to facilitate to facilitate the wireless communication device 120 prior to being synchronized to the server 110, wherein the said secure authentication process comprising the following steps:

In the first step, the wireless communication device 120 initiating the communication by sending client hello message to the server 110, wherein the client hello message includes a list of encryption algorithms that the wireless communication device 120 is prepared to use and some challenge data to be used to authenticate the server 110. The message contains the following fields:

TABLE 1

CLIENT HELLO MESSAGE

| Field | Length |
| --- | --- |
| The message type (client hello) | 8 bits |
| The SSL version number (currently 2) | 16 bits |
| The length of the cipher list | 16 bits |
| The length of the session identifier | 16 bits |
| The length of the challenge data | 16 bits |
| The cipher list | variable |
| The session identifier | $16 \leq$ data $\leq 32$ bytes |
| The challenge data | variable |

The session identifier is used to match the current request with a previous one, avoiding the need for repeated authenticate and key exchange if two systems have frequent communication. When keys are selected the server 110 will cache these and, if the wireless communication device 120 provides a session identifier in the client hello message the server 110 will search the cache for this session identifier. According to one exemplary embodiment of the invention, the message contains the above mentioned fields as well as additionally 'buffer memory' field having the length of 32 bits. The field and length of the client hello message can be varied based on the requirements.

In the second step, the server 110 generating a random number 'r' and a modulo value 'z' after receiving client hello message and subsequently sending the generated random number 'r' and the modulo value 'z' to the wireless communication device 120 via a secure channel.

In the third step, the wireless communication device 120 retrieving the random number 'r' and the modulo value 'z' and also two constants $\alpha i = \beta i = 1$, subsequently the wireless communication device 120 generating a random sequence 'S' $[S=\{r1, r2, r3, r4, r5, \ldots, rn, r, \text{mobile no, IMEI no, personnel data}\} \mod z]$ using DRSG algorithm, wherein the random numbers are r1, r2, r3, r4, r5, . . . , rn as seed values; the wireless communication device 120 applying forward difference operator or linear operator on the generated sequence 'S' for k times (order of sequence) then the wireless communication device 120 encrypting the generated random sequence Sk with the order k times of the sequence using pre-shared private key 'k' of the wireless communication device 120 and subsequently encrypting the encrypted sequence using a session key 'k1' generated through DRSG algorithm and finally the wireless communication device 120 encrypted message containing generated random sequence Sk with the order k times of the sequence to the server 110.

In the fourth step, the server 110 decrypting received encrypted message and subsequently retrieving the random sequence Sk with the order k times of the sequence, generating a new random sequences 'tk' with order the 'k' using DRSG algorithm with the same seed values and client's personnel information of the wireless communication device 120, then the server 110 validating the generated sequence 'tk' with the received sequence 'Sk' $\{Sk=tk\}$ and the order of the received sequence from the wireless communication device 120.

In the fifth step, the server 110 accepting synchronization process between the wireless communication device 120 and the server 110, if generated sequence 'tk' is equal to the received sequence 'Sk $\{Sk=tk\}$ and subsequently sending the response after validating $\{Sk=tk\}$ to the wireless communication device 120.

In the final step, the mutual authentication takes place between both the wireless communication device 120 and server 110 ends.

Figure 2:
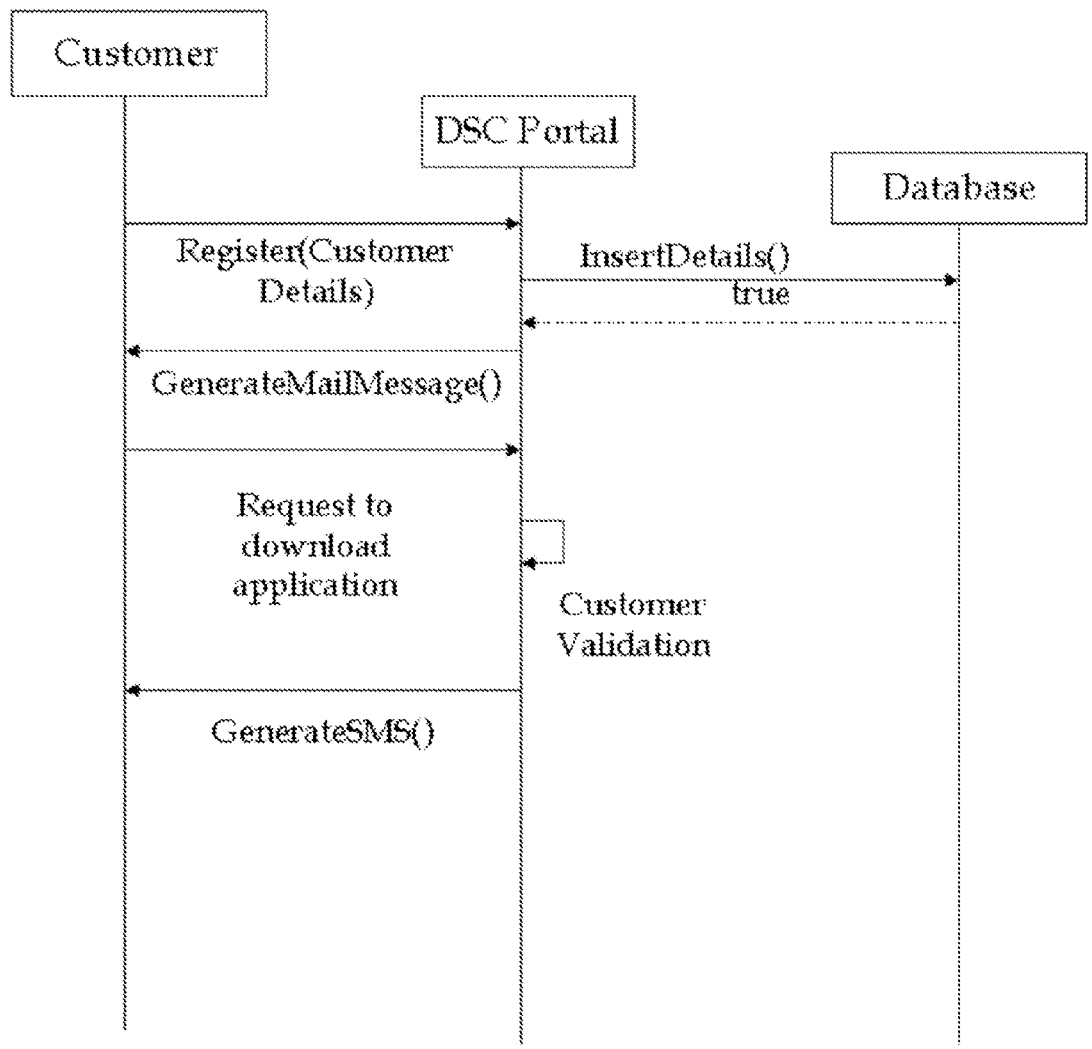
FIG. 2 illustrates how customer validation performed through secure synchronization protocol for wireless communication according to one embodiment of the invention.

FIG. 2 illustrates how customer validation performed through secure synchronization protocol for wireless communication according to one embodiment of the invention. Before initiating the communication in the above said system 100, initially, the server 110 registers the device, IMEI numbers of the wireless communication device 120, user/customer details of the wireless communication device 120 and then the server 110 distributing customer identity and transaction identity (Cust_ID and Tr_ID) to each wireless communication devices 120 prior to being synchronized to the server 110. Initially, the customer sends his/her details to a Distributed Source Coding (DSC) Portal and then the portal register the customer details and inserts the details {InsertDetails( )} into a database. Then the database validates the customer details, if the details is true, then it send the response to the DSC Portal. After receiving the response from the Database, the DSC Portal generate mail message {GenerateMailMessage( )} and send the same to the customer. After receiving the GenerateMailMessage( ) by the customer, then the customer request the DSC Portal to download the (secure synchronization protocol) application. Subsequently, the DSC Portal does customer validation after receiving the request the customer to download the secure synchronization protocol application and generates the SMS and send the same to the SMS {GenerateSMS( )} after downloading the (secure synchronization protocol) application.

Figure 3:
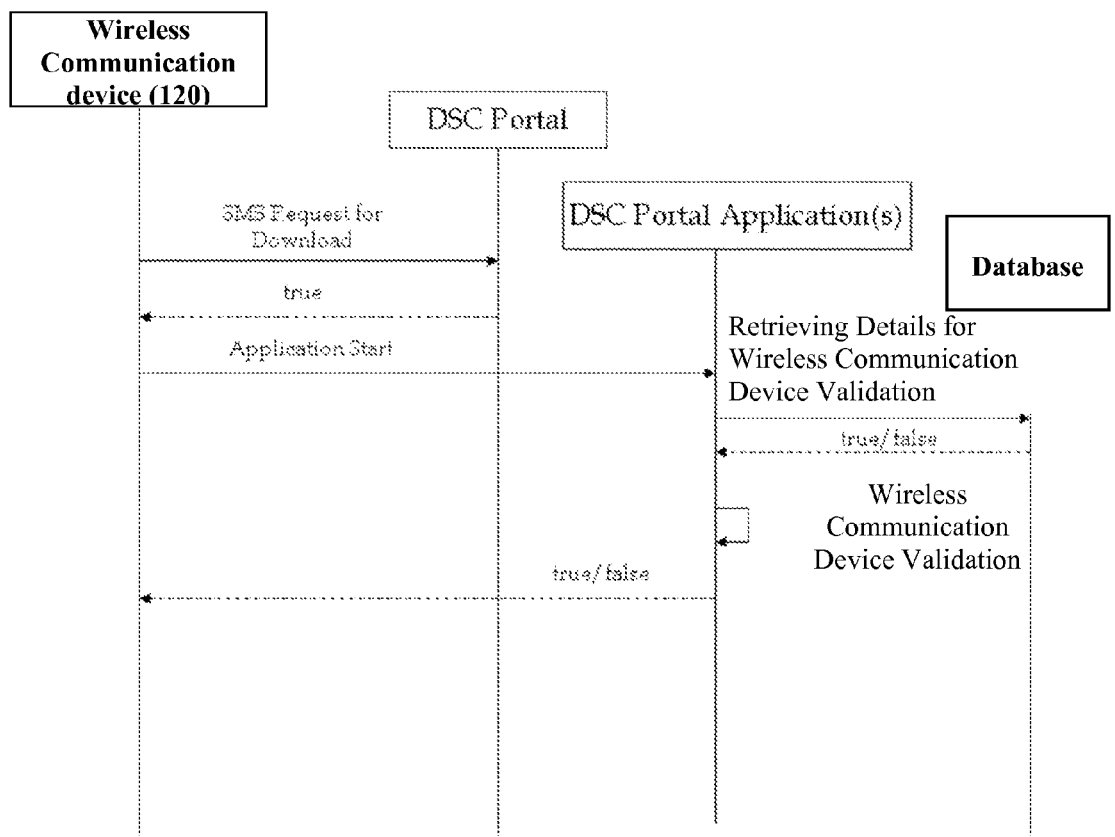
FIG. 3 illustrates wireless communication device validation performed through secure synchronization protocol according to one embodiment of the invention.

FIG. 3 illustrates wireless communication device validation performed through secure synchronization protocol according to one embodiment of the invention. According to one exemplary embodiment of the invention, the wireless communication device 120 can be mobile phone. Before initiating the communication in the above said system 100, in the first step, the server 110 registers mobile and IMEI numbers, personal data' of the user of the wireless communication device 120 and distributes customer identity and transaction identity (Cust_ID and Tr_ID) to each mobiles 120 prior to being synchronized to the server 110. In the final step, the server validating the wireless communication device 120. After receiving the customer identity and transaction identity (Cust_ID and Tr_ID), the wireless communication device 120 requests a DSC Portal for the download the (secure synchronization protocol) application via SMS. Subsequently, the DSC Portal does wireless communication device 120 validations and sends the response, if the response is true then the wireless communication device 120 starts downloading the application from a DSC Portal application (s). Before starts downloading the application from the DSC Portal application (s), the said DSC Portal application(s) retrieves the details for wireless communication device 120 validations from a Database. Then the Database does wireless communication device 120 validations and send the response (true/false) to the DSC Portal application(s), subsequently the DSC Portal application (s), receives the validation response from the database and then validates the data's and finally it sends the response to the validated data's to the wireless communication device 120.

According to one embodiment of the invention, before initiating the communication in the above said system 100, the algorithm DRSG with seeds is available to the wireless communication device 120 and the server 110. Both have the same seed values and the fixed $\alpha i$ and $\beta i$ and the Server 110 knows mobile number, mobile handset IMEI number and personnel data of user of the wireless communication device 120.

Figure 4:
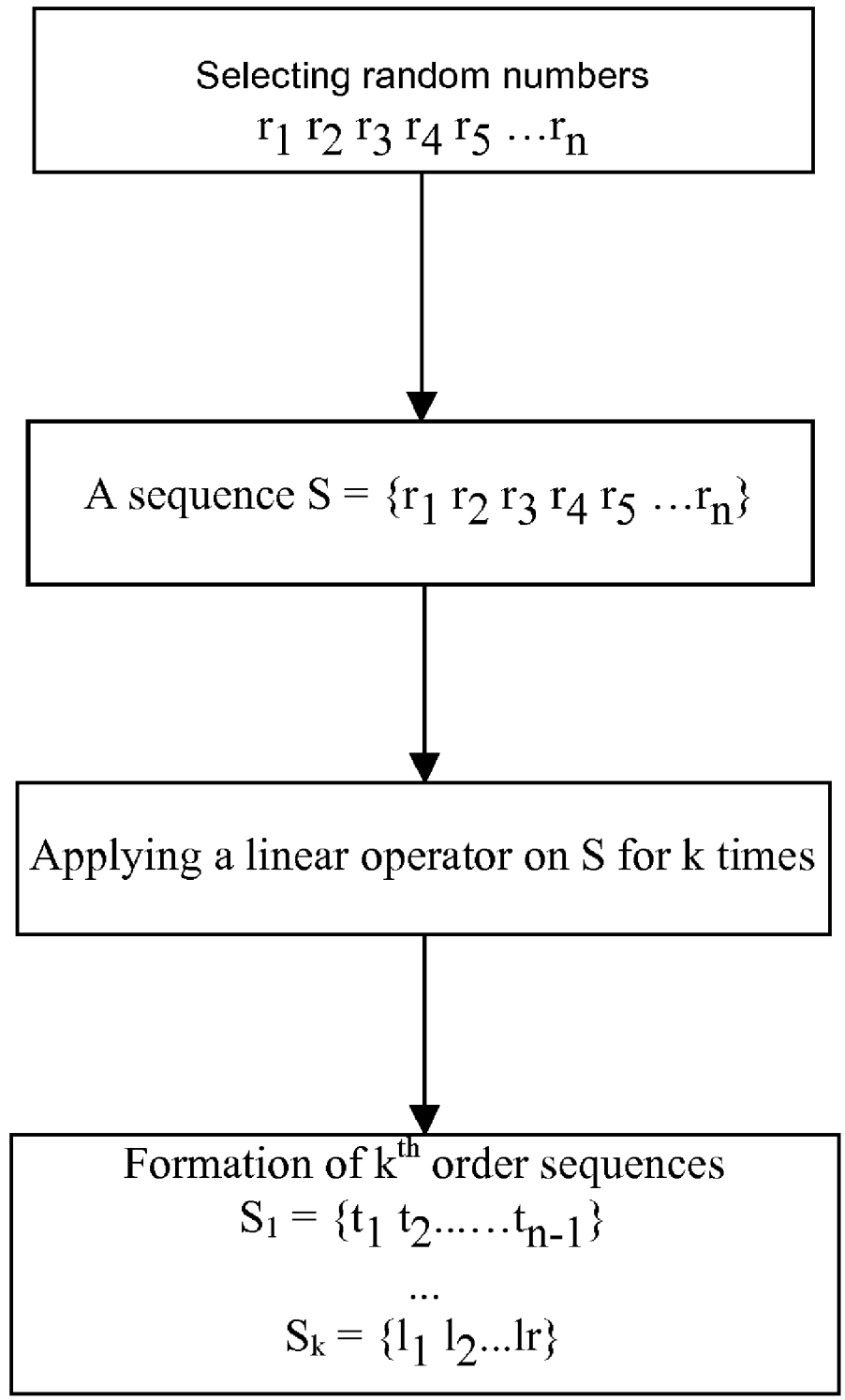
FIG. 4 illustrates a flow DRSG algorithm according to one embodiment of the invention.

FIG. 4 illustrates a flow DRSG algorithm according to one embodiment of the invention. Wherein the wireless communication device 120 generating a sequence in the order of k (times) 'Sk' and the server 110 generating a sequence in the order of k (times) 'tk' using DSRG algorithm, the said DRSG algorithm/process/method comprising the steps of:

In the first step, selecting at least two random numbers, for example, r1 r2 r3 r4 r5 . . . rn, where r1, r2 . . . rn are random integers.

In the second, third and final steps are as mentioned below, Generating a sequence from the selected random numbers, Generating a sequence from the selected random numbers; Applying a linear operator or a forward difference operator of order to the generated sequence; and Forming a random sequence with an order applied from the third step, for example:

$s1 s2 s3 \ldots Sk$ where $si = (\alpha 1 ri - \beta 1 ri - 1) \bmod z$, $z$ is an $m$-bit number $t1 t2 \ldots tr$ where $ti = (\alpha 2 si - \beta 2 si - 1) \bmod z$

...

...

$q$ where $q$ is an integer

For a given k=order of the original sequence S, we applies k times difference operator on S so that we get Sk=a sequence of integers l1 l2 . . . lp from DRSG process. In order to form a random number, we take mod operation on each element in Sk and then concatenate them i.e., l1 mod z∥l2 mod z∥ . . . ∥lp mod z. It is our choice to set values for $\alpha i$ and $\beta i$ in the forward difference operator. There are seeds used in this algorithm such as $\alpha i$, $\beta i$ and the initial set of random numbers r1 r2 r3 r4 r5 . . . rn.

Following examples explain the generation of the random sequences with the order of 'k' times using DSRG process according to one embodiment of the invention.

Example 1

Let S={809, 709, 125, 240, 456, 678, 789, 6565, 9329090, 12121} and set $\alpha i = \beta i = 1$ and z=1000. Then apply forward difference operator on S for 3 times as follows:

$S_1$={100, 584, −115, −216, −222, −111, −5776, −9322525, −9316969} mod 1000={100, 584, 885, 784, 778, 889, 224, 475, 31}

$S_2$={−484, −301, 101, 6, −111, 665, −251, 444} mod 1000={516, 699, 101, 6, 889, 335, 749, 556}

$S_3$={−183, 598, 95, −883, 554, −414, −193} mod 1000={817, 598, 95, 117, 554, 586, 807}

If we consider S3 for randomness, then we concatenate all the values in S3. Therefore, the generated random sequence is 81759895117554586807.

Example 2

Let S={809, 709, 125, 240, 456, 678, 789} and set $\alpha i=3$, $\beta i=2$ and z=500. Then apply forward difference operator on S for 3 times as follows:

$S_1$={1009, 1877, −105, −192, 12, 456} mod 500={9, 377, 395, 308, 12, 456}

$S_2$={−727, 341, 569, 900, −876} mod 500=(273, 341, 69, 400, 124}

$S_3$={137, 885, −593, 952} mod 500={137, 385, 407, 452}

If we consider S2 for randomness, then we concatenate all the values in S2. Therefore, the generated random sequence is 27334169400124.

According to one embodiment of the invention, distinct integers are taken up in a random manner. Then apply the forward difference operator to a sequence of n distinct integers (each integer of length 40-bits) and then the system gets a sequence of n−1 integers. Keep on applying forward difference operator to a sequence of positive integers till system attains a sequence consisting of a single integer. Given n distinct integers, (n−1) sequences are generated. Each sequence of numbers behaves like nonlinear. For a given sequence s of integers (1<s<n−1) generated from this process, it is computationally difficult to find out the original sequence of integers.

The order of a random sequence means the number of times forward difference operator applied on a sequence. For instance, the first order of a given sequence S={7, 5, 11, 17, −5} is 2, −6, −6, 22 and so on. In the same sequence S, the system gets the first order of S=2, 6, 6, 22 when positive forward difference operator is applied on S. There is a choice to choose any linear operator through the system on a sequence. If one needs to determine the generated random sequence, one should know the order, the original sequence and the linear operator.

Below is the estimation of random sequence length according to one embodiment of the invention.

Given a set of 40-bit random numbers and a linear operator with $\alpha i$ and $\beta i$, we can determine the first order sequence length and so on. The following table helps us to estimate the required random sequence length (in bits) approximately.

TABLE 2

| Sr. No | Number of 40-bit random integers | Fixing values $\alpha_i$ and $\beta_i$ in a linear operator | First order random sequence of length (in bits) w.r.to mod z, where z is an m-bit number (m > 40) | Second order random sequence of length (in bits) w.r.to mod z, where z is an m-bit number (m > 40) |
|---|---|---|---|---|
| 1 | 10 | $\alpha_i = \beta_i = $ 1-bit | 360 | 320 |
| 2 | 10 | $\alpha_i = \beta_i = $ 4-bits | 396 | 352 |
| 3 | 15 | $\alpha_i = \beta_i = $ 1-bit | 560 | 520 |

TABLE 2-continued

| Sr. No | Number of 40-bit random integers | Fixing values $\alpha_i$ and $\beta_i$ in a linear operator | First order random sequence of length (in bits) w.r.to mod z, where z is an m-bit number (m > 40) | Second order random sequence of length (in bits) w.r.to mod z, where z is an m-bit number (m > 40) |
|---|---|---|---|---|
| 4 | 20 | $\alpha_i = \beta_i = $ 8-bits | 912 | 864 |
| 5 | 20 | $\alpha_i = \beta_i = $ 1-bit | 760 | 720 |
| 6 | 32 | $\alpha_i = \beta_i = $ 1-bit | 1240 | 1200 |
| 7 | 64 | $\alpha_i = \beta_i = $ 1-bit | 2520 | 2480 |
| 8 | 128 | $\alpha_i = \beta_i = $ 1-bit | 5080 | 5040 |
| 9 | 128 | $\alpha_i = \beta_i = $ 2-bits | 5334 | 5292 |

Figure 5:
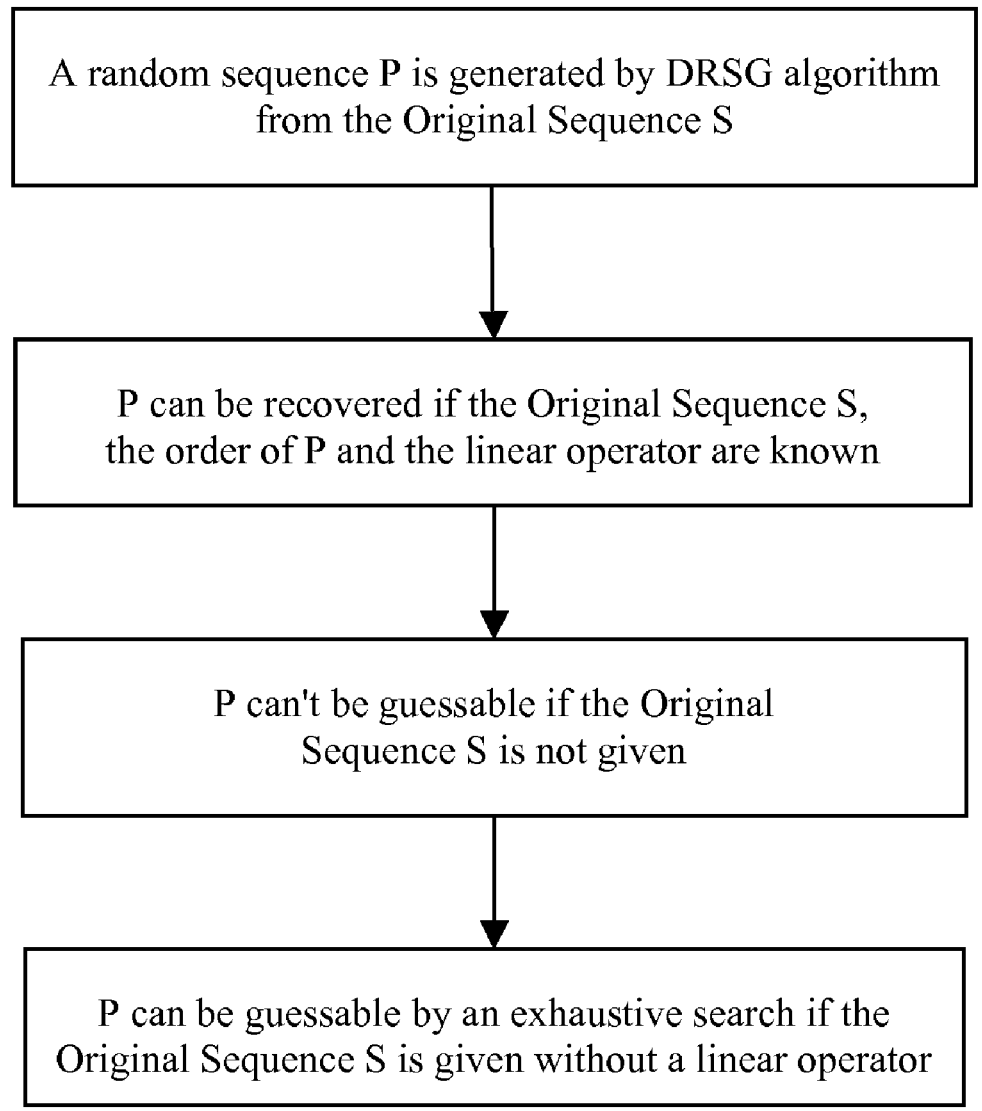
FIG. 5 illustrates the complexity of DRSG algorithm according to one embodiment of the invention.

FIG. 5 illustrates the complexity of DRSG algorithm according to one embodiment of the invention. A random sequence P is generated by DRSG algorithm from the Original Sequence S and then P can be recovered if the Original Sequence S, the order of P and the linear operator are known, if the Original Sequence S is not given then P can't be guessable. However, P can be guessable by an exhaustive search if the Original Sequence S is given without a linear operator.

According to various embodiments of the invention, the invention provides an efficient way to generate a huge size collection of pseudorandom numbers with a less computational complexity and DRSG is designed for mobile and wireless communications and also the said DRSG algorithm is a lightweight algorithm.

The invention is described in the example given below which is provided only to illustrate the invention and therefore should not be construed to limit the scope of the invention.

The invention (DRSG module for generating the random sequences and authentication process for synchronization between the server and the wireless communication device) has been tested in Nokia handset series N79, E75, 5800 and 6210. As per the performance, these mobiles could take around 1 micro second to generate a random sequence of size 8192 bits. This is a remarkable performance compared with other Pseudo random number generators.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

A system and method for secure synchronization between at least one wireless communication device and a server by using Deterministic Random Number Generator (DRNG) through linear operators without using multi-precision integers at an affordable cost in accordance with this invention described above finds a number of applications in Information Security and mobile communication. Some specific areas where the invention can be applied are as follows: Session key generation, Mobile validation, Customer validation, Signature protocols, Client-Server protocols, Symmetric Encryption algorithm, Authentication protocols, Digital Signal Process, and Extensible Authentication protocols.

The preceding description has been presented with reference to various embodiments of the invention. Persons skilled in the art and technology to which this invention pertains will appreciate that alterations and changes in the described process and methods of operation, use of the software and hardware other than those described can be practiced without meaningfully departing from the principle, spirit and scope of this invention.

I claim:

1. A method of authenticating a wireless communication device, comprising the steps of:
   transmitting a first message to a server from a communication device;
   transmitting a random number and a modulo value to the communication device from the server;
   generating a first random sequence using the random number and the modulo value by the communication device using a Deterministic Random Sequence Generation (DRSG) process;
   generating an encrypted message by encrypting the first random sequence using a pre-shared private key and a session key at the communication device;
   transmitting the encrypted message to the server from the communication device;
   retrieving the first random sequence by decrypting the encrypted message at the server;
   generating a second random sequence at the server by applying the DRSG process to an order value, a seed value and communication device identifying information obtained from decrypting the first random sequence;
   comparing the second random sequence and the first random sequence at the server; and
   authorizing a synchronization process with the communication device by the server if the second random sequence equals the first random sequence, and if an order of the second random sequence equals the order of the first random sequence.

2. The method of claim 1, further comprising registering at the server at least one of a device number and an IMEI number of the communication device.

3. The method of claim 1, where in the DSRG process comprises the steps of:
   selecting at least two random numbers;
   generating a sequence using the two random numbers;
   applying a linear operator or a forward difference operator of an order to the sequence; and
   generating a random sequence with the order.

4. The method of claim 1, wherein the communication device is a wireless communication device enabled to operate using a 2G, 3G, or 4 G communication protocol.

5. A system of authenticating a wireless communication device, comprising: a communication device configured to transmit a first message to a server;
   a first transceiver at the server configured to transmit a random number and a modulo value to the communication device;
   a first sequence generator at the communication device configured to generate a first random sequence using the random number and the modulo value using a Deterministic Random Sequence Generation (DRSG) process;

an encryption module at the communication device configured to generate an encrypted message using the first random sequence using a pre-shared private key and a session key;
a second transceiver at the communication device configured to transmit the encrypted message to the server;
a second sequence generator at the server configured to generate a second random sequence by applying the DRSG process to an order value, a seed value and communication device identifying information obtained from decrypting the first random sequence; and
a processor at the server configured to compare the second random sequence and the first random sequence, wherein the processor is further configured to authorize a synchronization process of the server with the communication device if the second random sequence equals the first random sequence, and if an order of the second random sequence equals the order of the first random sequence.

6. The system of claim 5, wherein the server is configured to register at least one of a device number and an IMEI number of the communication device.

7. The system of claim 5, wherein the communication device is a wireless communication device enabled to operate using a 2G, 3G, or 4 G communication protocol.

* * * * *